United States Patent
Chen et al.

(10) Patent No.: US 11,917,189 B2
(45) Date of Patent: Feb. 27, 2024

(54) MOTION VECTOR PREDICTION FOR VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Hong-Jheng Jhu, San Diego, CA (US); Shuiming Ye, San Diego, CA (US); Xianglin Wang, San Diego, CA (US)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 263 days.

(21) Appl. No.: 17/542,151

(22) Filed: Dec. 3, 2021

(65) Prior Publication Data

US 2022/0094970 A1    Mar. 24, 2022

Related U.S. Application Data

(63) Continuation of application No. PCT/US2020/037649, filed on Jun. 13, 2020.
(Continued)

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/172* (2014.11); *H04N 19/176* (2014.11); *H04N 19/46* (2014.11)

(58) Field of Classification Search
CPC .... H04N 19/52; H04N 19/105; H04N 19/172; H04N 19/176; H04N 19/46
(Continued)

(56) References Cited

U.S. PATENT DOCUMENTS

2012/0236941 A1*   9/2012   Lin ................. H04N 19/52
                                                    375/E7.123
2014/0037011 A1*   2/2014   Lim ................ H04N 19/513
                                                    375/240.16
(Continued)

FOREIGN PATENT DOCUMENTS

KR    20130030232 A    3/2013
KR    20160135306 A    11/2016
KR    20190008214 A    1/2019

OTHER PUBLICATIONS

Wiegand Thomas et al., "WD2: Working Draft 2 of High-Efficiency Video Coding", Joint Collaborative Team on Video Coding (JCT-VC) of ITU-T SG16 WP3 and ISO/IEC JTC1/SC29/WG11 4th Meeting: Daegu, KR, Jan. 20-28, 2011, [JCTVC-D503], JCTVC-D503 (version 2), ITU-T, Apr. 15, 2011,(9p).
(Continued)

*Primary Examiner* — Dominic D Saltarelli
(74) *Attorney, Agent, or Firm* — Arch & Lake LLP (57) ABSTRACT

A method of decoding a video signal, apparatus, and a non-transitory computer-readable storage medium are provided. The method includes obtaining a video block from the video signal, obtaining spatial neighboring blocks based on the video block, obtaining up to one left non-scaled motion vector predictor (MVP) based on the multiple left spatial neighboring blocks, obtaining up to one above non-scaled MVP based on the multiple above spatial neighboring blocks, deriving, at the decoder and by reducing possibility of selecting scaled MVPs derived from the spatial neighboring blocks, an MVP candidate list based on the video
(Continued)

block, the multiple left spatial neighboring blocks, the multiple above spatial neighboring blocks, receiving a best MVP based on the MVP candidate list, and obtaining a prediction signal of the video block based on the best MVP.

20 Claims, 6 Drawing Sheets

Related U.S. Application Data (60) Provisional application No. 62/861,315, filed on Jun. 13, 2019.

(51) Int. Cl.
  *H04N 19/172* (2014.01)
  *H04N 19/176* (2014.01)
  *H04N 19/46* (2014.01)

(58) Field of Classification Search
  USPC .................................................. 375/240.16
  See application file for complete search history.

(56) References Cited

U.S. PATENT DOCUMENTS

| | | | |
|---|---|---|---|
| 2014/0126643 | A1 | 5/2014 | Park et al. |
| 2014/0348241 | A1 | 11/2014 | Lim et al. |
| 2015/0271487 | A1 | 9/2015 | Li et al. |
| 2017/0332099 | A1 | 11/2017 | Lee et al. |
| 2018/0176593 | A1 | 6/2018 | Park et al. |
| 2019/0110068 | A1 | 4/2019 | Lim et al. |
| 2021/0067771 | A1* | 3/2021 | Lin ............... H04N 19/109 |
| 2021/0211644 | A1* | 7/2021 | Su ................ H04N 19/51 |
| 2021/0235100 | A1* | 7/2021 | Lee ............... H04N 19/44 |

OTHER PUBLICATIONS

Bross, Benjamin et al., "Versatile Video Coding (Draft 5)", Joint Video Experts Team (JVET) of ITU-T SG 16 WP 3 and ISO/IEC JTC 1/SC 29/WG 11 14th Meeting: Geneva, CH, Mar. 19-27, 2019, [JVET-N1001-v8], JVET-N1001 (version 8), ITU-T, Jun. 11, 2019, (10p).
First Office Action of Japanese Application No. 2021-572067 dated Jun. 7, 2022 with English translation, (10p).
First Office Action of European Patent Application No. 20822635.7 dated Jul. 5, 2022, (10p).
Bross, Benjamin, et al., "Versatile Video Coding (Draft 5)", Joint Video Experts Team (JVET) of ITU-T SG 16 WP 3 and ISO/IEC JTC 1/SC 29/WG 11, JVET-N1001-v8, 14th Meeting: Geneva, CH, Mar. 19-27, 2019, (21p).
McCann, Ken, et al., "HM4: High Efficiency Video Coding (HEVC) Test Model 4 Encoder Description", Joint Collaborative Team on Video Coding (JCT-VC) of ITU-T SG16 WP3 and ISO/IEC JTC1/SC29/WG11, JCTVC-F802, 6th Meeting: Torino IT, Jul. 14-22, 2011, WG11 No. N21450, (6p).
Bross, Benjamin et al., Versatile Video Coding (Draft 5) of ITU-T SG 16 WP 3 and ISO/IEC JTC 1/SC 29/WG 11, JVET-N1001-v8, 14th Meeting: Geneva, CH, Mar. 19-27, 2019, (398p).
Itani, Yusuki et al., "Improvement to AMVP/Merge Process", Joint Collaborative Team on Video Coding (JCT-VC) of ITU-T SG16 WP3 and ISO/IEC JTC1/SC29/WG11, JCTVC-E064, 5th Meeting: Geneva CH, Mar. 16-23, 2011, (8p).
Zhou, Minhua, "CE9: Evaluation results on SP01, SP02, SP03 and SP14", Joint Collaborative Team on Video Coding (JCT-VC) of ITU-T SG16 WP3 and ISO/IEC JTC1/SC29/WG11, JCTVC-F084, 6th Meeting: Torino, IT Jul. 14-22, 2011, (6p).
Zhou, Minhua, "CE9: Simplified AMVP Design (SP06S1, SP06S2)", Joint Collaborative Team on Video Coding (JCT-VC) of ITU-T SG16 WP3 and ISO/IEC JTC1/SC29/WG11, JCTVC-F088, 6th Meeting: Torino, IT Jul. 14-22, 2011, (12p).
Park, Seungwook et al., "A Study on Simplification of Spatial/Temporal MVP Scaling (CE9 SP01+SP06S2+SP07)", Joint Collaborative Team on Video Coding (JCT-VC) of ITU-T SG16 WP3 and ISO/IEC JTC1/SC29/WG11, JCTVC-F089, 6th Meeting: Torino, IT, Jul. 14-22, 2011, M20501, (10p).
Preliminary Draft of ISO/IEC FDIS 23008-2:201x (4th Ed.), ISO/IEC JTC 1/SC 29WG 11 N 18095 dated Oct. 12, 2018, Information Technology—High Efficiency Coding and Media Delivery in Heterogeneous Environments—Part 2: High Efficiency Video Coding, MPEG Meeting Jan. 4, 2019, (872p).
Chen, Yi-Wen et al., Non-CE4: Simplification of MVP List Construction, Joint Video Experts Team (JVET) of ITU-T SG 16 WP 3 and ISO/IEC JTC 1/SC 29/WG 11, JVET-O0587, 15th Meeting: Gothenburg, SE Jul. 3-12, 2019, (4p).
Chen, Huanbang et al., "Non-CE4: Simplification on AMVP List Construction", Joint Video Experts Team (JVET) of ITU-T SG 16 WP 3 and ISO/IEC JTC 1/SC 29/WG 11, JVET-O0164-v1, 15th Meeting: Gothenburg, SE, Jul. 3-12, 2019, (6p).
Huang, Yu-Wen et al., "Description of Core Experiment 9: MV Coding and Skip/Merge Operations", Joint Collaborative Team on Video Coding (JCT-VC) of ITU-T SG16 WP3 and ISO/IEC JTC1/SC29/WG11, JCTVC-E709, 5th Meeting: Geneva CH, Mar. 16-23, 2011, (10p).
Zhou, Minhua, "CE9: Cross-Check Results on SP05, SP06, SP08, SP13, PART16", Joint Collaborative Team on Video Coding (JCT-VC) of ITU-T SG16 WP3 and ISO/IEC JTC1/SC29/WG11, JCTVC-F080, 6th Meeting: Torino, IT, Jul. 14-22, 2011, (6p).
International Search Report of PCT Application No. PCT/US2020/037649 dated Sep. 25, 2020, (2p).
Yu, Ruoyang, et al., "CE4-related: On MVP candidate list generation for AMVP", JVET-M0117, Joint Video Experts Team (JVET) of ITU-T SG 16 WP 3 and ISO/IEC JTC 1/SC 29/WG 11, 13th Meeting: Marrakech, MA, Jan. 17, 2019, (xp).
Xu, Liying, et al., "Non-CE4: On spatial candidate list construction", JVET-N0165, Joint Video Experts Team (JVET) of ITU-T SG 16 WP 3 and ISO/IEC JTC 1/SC 29/WG 11, 14th Meeting: Geneva, CH, Mar. 21, 2019, (3p).

* cited by examiner

MOTION VECTOR PREDICTION FOR VIDEO CODING

CROSS-REFERENCE TO RELATED APPLICATION

This application is a continuation application of PCT application No. PCT/US2020/037649 filed on Jun. 13, 2020, which is based upon and claims priority to Provisional Application No. 62/861,315 filed on Jun. 13, 2019, the entire disclosures of which are incorporated herein by reference in their entireties for all purposes.

TECHNICAL FIELD

This disclosure is related to video coding and compression. More specifically, this disclosure relates to methods and apparatus for motion vector prediction in video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate while avoiding or minimizing degradations to video quality.

SUMMARY

Examples of the present disclosure provide methods and apparatus for motion vector prediction in video coding.

According to a first aspect of the present disclosure, a method of decoding a video signal is provided. The method may include obtaining, at a decoder, a video block from the video signal. The method may further include obtaining, at the decoder, spatial neighboring blocks based on the video block. The spatial neighboring blocks may include multiple left spatial neighboring blocks and multiple above spatial neighboring blocks. The method may include obtaining, at the decoder, up to one left non-scaled motion vector predictor (MVP) based on the multiple left spatial neighboring blocks. The method may also include obtaining, at the decoder, up to one above non-scaled MVP based on the multiple above spatial neighboring blocks. The method may include deriving, at the decoder and by reducing possibility of selecting scaled MVPs derived from the spatial neighboring blocks, an MVP candidate list based on the video block, the multiple left spatial neighboring blocks, the multiple above spatial neighboring blocks. The MVP candidate list may include the up to one left non-scaled MVP and the up to one above non-scaled MVP. The method may additionally include receiving, at the decoder, a best MVP based on the MVP candidate list. An encoder selects the best MVP from the MVP candidate list. The method may include obtaining, at the decoder, a prediction signal of the video block based on the best MVP.

According to a second aspect of the present disclosure, a computing device for decoding a video signal is provided. The computing device may include one or more processors, a non-transitory computer-readable memory storing instructions executable by the one or more processors. The one or more processors may be configured to obtain a video block from the video signal. The one or more processors may be further configured to obtain spatial neighboring blocks based on the video block. The spatial neighboring blocks may include multiple left spatial neighboring blocks and multiple above spatial neighboring blocks. The one or more processors may be configured to obtain up to one left non-scaled MVP based on the multiple left spatial neighboring blocks. The one or more processors may also be configured to obtain up to one above non-scaled MVP based on the multiple above spatial neighboring blocks. The one or more processors may be configured to derive, by reducing possibility of selecting scaled MVPs derived from the spatial neighboring blocks, an MVP candidate list based on the video block, the multiple left spatial neighboring blocks, the multiple above spatial neighboring blocks. The MVP candidate list may include the up to one left non-scaled MVP and the up to one above non-scaled MVP. The one or more processors may additionally be configured to receive a best MVP based on the MVP candidate list. An encoder selects the best MVP from the MVP candidate list. The one or more processors may be configured to obtain a prediction signal of the video block based on the best MVP.

According to a third aspect of the present disclosure, a non-transitory computer-readable storage medium having stored therein instructions is provided. When the instructions are executed by one or more processors of the apparatus, the instructions may cause the apparatus to perform obtaining, at a decoder, a video block from the video signal. The instructions may cause the apparatus to perform obtaining, at the decoder, spatial neighboring blocks based on the video block. The spatial neighboring blocks may include multiple left spatial neighboring blocks and multiple above spatial neighboring blocks. The instructions may further cause the apparatus to perform obtaining, at the decoder, up to one left non-scaled MVP based on the multiple left spatial neighboring blocks. The instructions may cause the apparatus to perform obtaining, at the decoder, up to one above non-scaled MVP based on the multiple above spatial neighboring blocks. The instructions may additionally cause the apparatus to perform deriving, at the decoder and by reducing possibility of selecting scaled MVPs derived from the spatial neighboring blocks, an MVP candidate list based on the video block, the multiple left spatial neighboring blocks, the multiple above spatial neighboring blocks. The MVP candidate list may include the up to one left non-scaled MVP and the up to one above non-scaled MVP. The instructions may also cause the apparatus to perform receiving, at the decoder, a best MVP based on the MVP candidate list. An encoder selects the best MVP from the MVP candidate list. The instructions may also cause the apparatus to perform obtaining, at the decoder, the scaled MVPs derived from the spatial neighboring blocks after obtaining history-based MVPs.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Video Coding System

Conceptually, the video coding standards mentioned above are similar. For example, they all use block-based processing and share similar video coding block diagram to achieve video compression.

Figure 1:
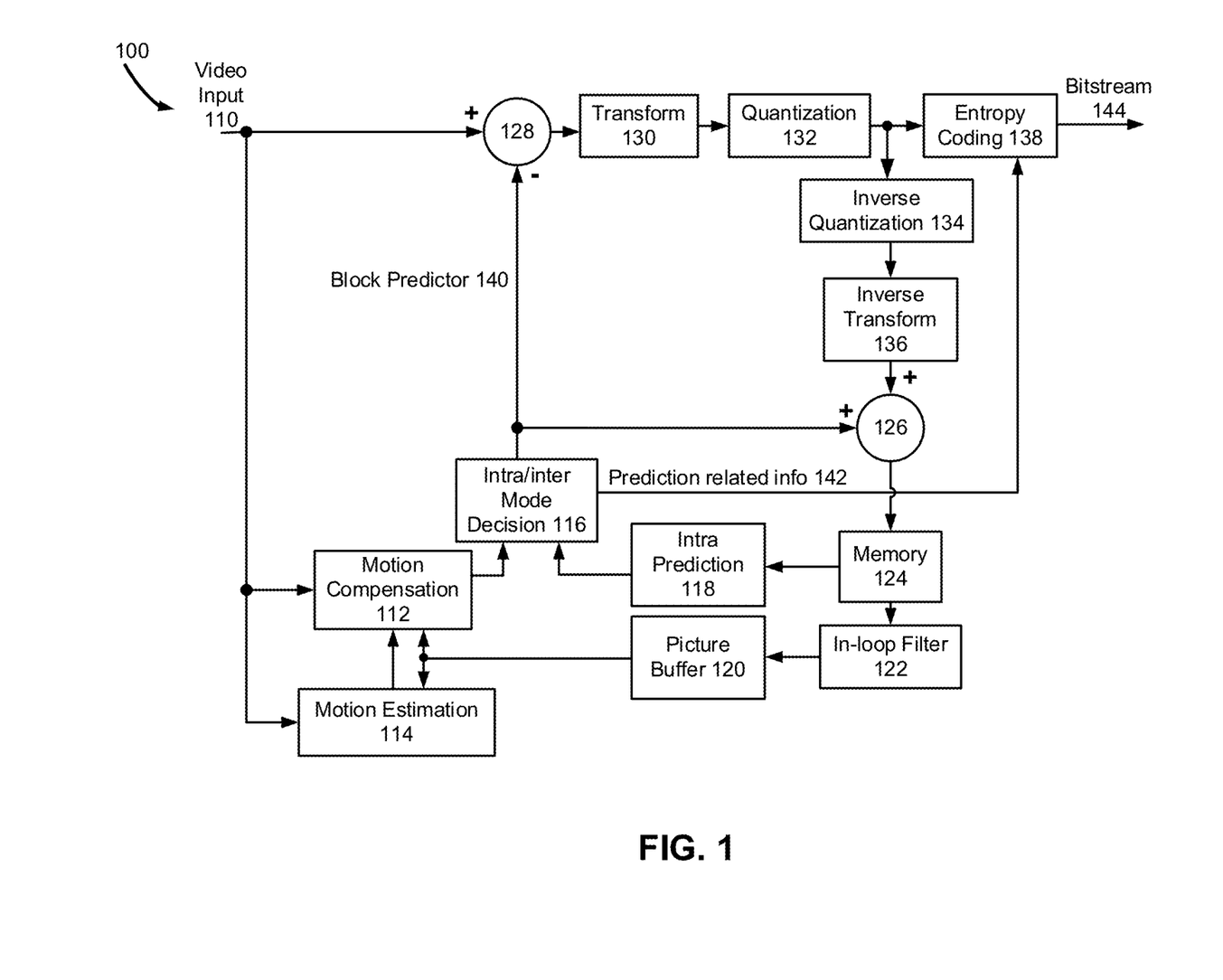
FIG. 1 is a block diagram of an encoder, according to an example of the present disclosure.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

In the encoder, a video frame is partitioned into blocks for processing. For each given video block, a prediction is formed based on either inter prediction or intra prediction. In inter prediction, predictors may be formed through motion estimation and motion compensation, based on pixels from previously reconstructed frames. In intra prediction, predictors may be formed based on reconstructed pixels in the current frame. Through mode decision, a best predictor may be chosen to predict a current block.

The prediction residual (i.e., the difference between a current block and its predictor) is sent to transform module. Transform coefficients are then sent to quantization module for entropy reduction. Quantized coefficients are fed to entropy coding module to generate compressed video bitstream. As shown in FIG. 1, prediction related info from inter and/or intra prediction modules, such as block partition info, motion vectors, reference picture index, and intra prediction mode, etc., are also going through entropy coding module and saved into bitstream.

In the encoder, decoder related modules are also needed in order to reconstruct pixels for prediction purposes. First, prediction residual is reconstructed through inverse quantization and inverse transform. Such reconstructed prediction residual is combined with the block predictor to generate un-filtered reconstructed pixels for a current block.

To improve coding efficiency and visual quality, in-loop filter is commonly used. For example, deblocking filter is available in AVC, HEVC as well as the current VVC. In HEVC, an additional in-loop filter called SAO (sample adaptive offset) is defined to further improve coding efficiency. In the latest VVC, yet another in-loop filter called ALF (adaptive loop filter) is being actively investigated, and it has a high chance of being included in the final standard.

Figure 2:
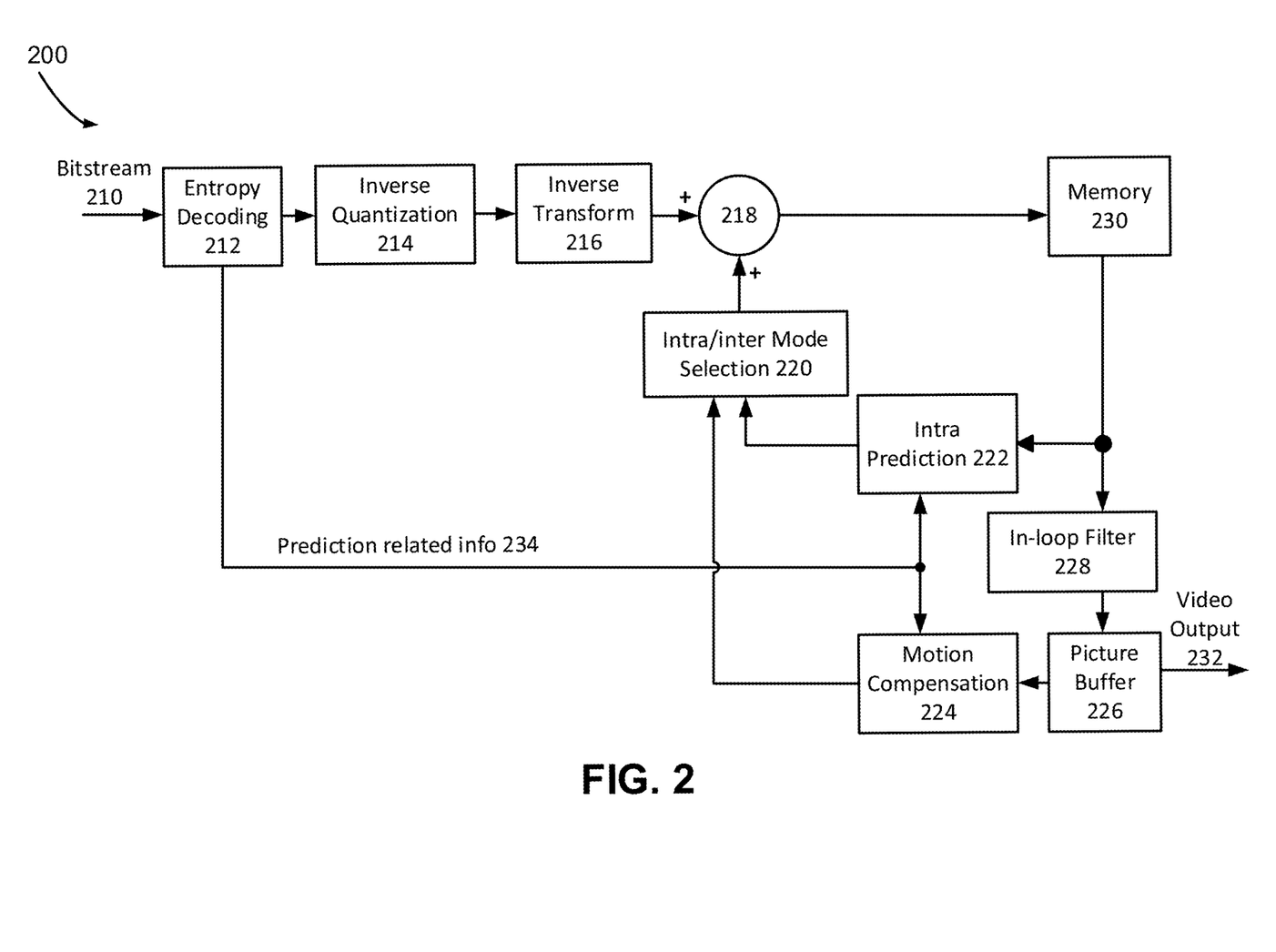
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232. Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 shows a typical decoder block diagram for these standards. One can see that it is almost the same as the reconstruction related section residing in the encoder.

In the decoder, a bitstream is first decoded through entropy decoding module to derive quantized coefficient levels and prediction related info. Quantized coefficient levels are then processed through inverse quantization and inverse transform modules to obtain reconstructed prediction residual. Block predictor is formed through either intra prediction or motion compensation process based on prediction info decoded. The unfiltered reconstructed pixels are obtained by summing up the reconstructed prediction residual and the block predictor. In case in-loop filter is turned on, filtering operations is performed on these pixels to derive the final reconstructed video for output.

Versatile Video Coding (VVC)

At the $10^{th}$ JVET meeting (Apr. 10-20, 2018, San Diego, US), JVET defined the first draft of Versatile Video Coding (VVC) and the VVC Test Model 1 (VTM1) encoding method. It was decided to include a quadtree with nested multi-type tree using binary and ternary splits coding block structure as the initial new coding feature of VVC. Since then, the reference software VTM to implement the encoding method and the draft VVC decoding process has been developed during the JVET meeting.

The picture partitioning structure divides the input video into blocks called coding tree units (CTUs). A CTU is split using a quadtree with nested multi-type tree structure into coding units (CUs), with a leaf coding unit (CU) defining a region sharing the same prediction mode (e.g., intra or inter). In this document, the term 'unit' defines a region of an image covering all components; the term 'block' is used to define a region covering a particular component (e.g., luma), and may differ in spatial location when considering the chroma sampling format such as 4:2:0.

Motion Vector Prediction in VVC

Figure 3:
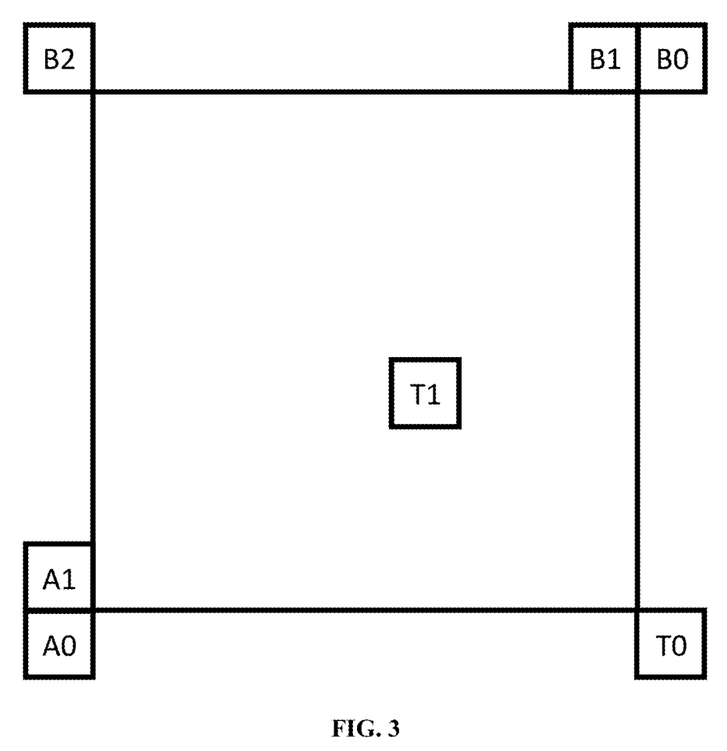
FIG. 3 is a diagram illustrating candidate positions for spatial MVP candidates and temporal MVP candidates, according to an example of the present disclosure.

Motion vector prediction exploits spatial and temporal correlation of motion vector of the neighboring CUs, which is used for explicit transmission of motion parameters. It constructs a MVP candidate list by firstly checking the availability of left, above, and temporally neighboring block positions (as shown in FIG. 3, described below) and history-based MVs. It then removes redundant candidates and adding zero vector to make the candidate list to be constant length. Then, the encoder can select the best predictor from the candidate list and transmit the corresponding index indicating the chosen candidate. The index of the best motion vector candidate is then encoded into the bitstream. In the following sections, details about the derivation process of MVP candidates are provided.

FIG. 3 shows candidate positions for spatial MVP candidates A0, A1, B0, B1, and B2 and temporal MVP candidates T0 and T1.

Derivation of Motion Vector Predictor Candidates

In VVC, the MVP candidate list is constructed by including the following candidates in order:

(1) Derive up to one non-scaled MVP from left spatial neighbor CUs (A0→A1).

(2) If no non-scaled MVP from left is available, derive up to one scaled MVP from left spatial neighbor CUs (A0→A1).

(3) Derive up to one non-scaled MVP from above spatial neighbor CUs(B0→B1→B2).

(4) If both neighbor block $A_0$ and $A_1$ are not available or coded in intra modes, derive up to one scaled MVP from above spatial neighbor CUs(B0→B1→B2).

(5) Conditional Pruning.

(6) Derive up to one MVP from temporal collocated CUs (T0→T1).

(7) Derive up to two history-based MVPs from a FIFO table.

(8) Derive up to two Zero MVs.

The item 5 "Conditional pruning" is conducted when there are two MVP candidates derived from the spatial blocks. The two MVP candidates are compared to each other and one is removed from the MVP candidate list when they are identical. The size of inter MVP list is fixed as 2. For each CU coded in inter prediction but non-merge mode, a flag is coded to indicate which MVP candidate is used.

In motion vector prediction, three types of MVP candidates are considered: spatial MVP candidate, temporal MVP candidate, and history-based MVP candidate. For spatial MVP candidate derivation, up to two MVP candidates are derived based on motion vectors of each block located in five different positions, as depicted in FIG. 3. For temporal MVP candidate derivation, up to one MVP candidate is selected from two candidates which are derived based on two different co-located positions. If the number of MVP candidates is smaller than two, additional zero motion vector candidates are added to the list to make it two.

Spatial Motion Vector Predictor Candidates

In the derivation of spatial motion vector predictor candidates, a maximum of two candidates may be selected among up to five potential candidates, which are derived from blocks located as depicted in FIG. 3. Those block positions are the same as those used for deriving MVP candidates for merge mode. For those blocks located at the left side of the current block, including $A_0$, $A_1$, their MV checking order is defined as $A_0$, $A_1$, and scaled $A_0$, scaled $A_1$. Here scaled $A_0$, scaled $A_1$ refer to the scaled MV of block $A_0$, $A_1$, respectively. For those blocks located above the current block, including $B_0$, $B_1$, $B_2$, their MV checking order is defined as $B_0$, $B_1$, $B_2$, scaled $B_0$, scaled $B_1$, scaled $B_2$. For each side, there are four cases to be checked in deriving motion vector candidate, with two cases wherein spatial MV scaling is not required, and the other two cases wherein spatial MV scaling is required. The four different cases are summarized as follows.

Cases wherein no spatial MV scaling is required:

(1) MV with the same reference picture list and same reference picture index (same POC).

(2) MV with different reference picture list, but same reference picture (same POC).

Cases wherein spatial MV scaling is required:

(3) MV with the same reference picture list, but different reference picture (different POC).

(4) MV with different reference picture list, and different reference picture (different POC).

The no-spatial-MV-scaling cases (case 1 and 2 above) are checked first, followed by the cases with spatial MV scaling required (case 3 and 4 above). More specifically, for MV, checking order is according to the following steps:

From block $A_0$, $A_1$, up to one MV candidate is derived by checking the following cases in sequential order: $A_0$ case 1→$A_0$ case 2→$A_1$ case 1→$A_1$ case 2→$A_0$ case 3→$A_0$ case 4→$A_1$ case 3→$A_1$ case 4.

Up to one MV candidate is derived from block $B_0$, $B_1$, $B_2$ by checking the following cases in sequential order: $B_0$ case 1→$B_0$ case 2→$B_1$ case 1→$B_1$ case 2→$B_2$ case 1→$B_2$ case 2.

If no MV candidate is derived from step 1, up to one MV candidate is derived from block $B_0$, $B_1$, $B_2$ by checking the following cases in a sequential order: $B_0$ case 3→$B_0$ case 4→$B_1$ case 3→$B_1$ case 4→$B_2$ case 3→$B_2$ case 4.

If the number of MVP candidates is smaller than two, additional zero motion vector candidates are added to the list to make it two.

Spatial MV scaling is needed when the POC of the reference picture of the neighboring block is different from the POC of the current block, regardless of reference picture list. As can be seen in the steps above, if no MVs of the blocks on the left side of the current block are available (e.g., blocks are not available or all those blocks are intra coded), MV scaling is allowed for the motion vector of those blocks on the above side of the current block. Otherwise, spatial MV scaling is not allowed for the above blocks' motion vector. As a result, only up to one spatial MV scaling is needed in the whole MV prediction candidate derivation process.

Figure 4:
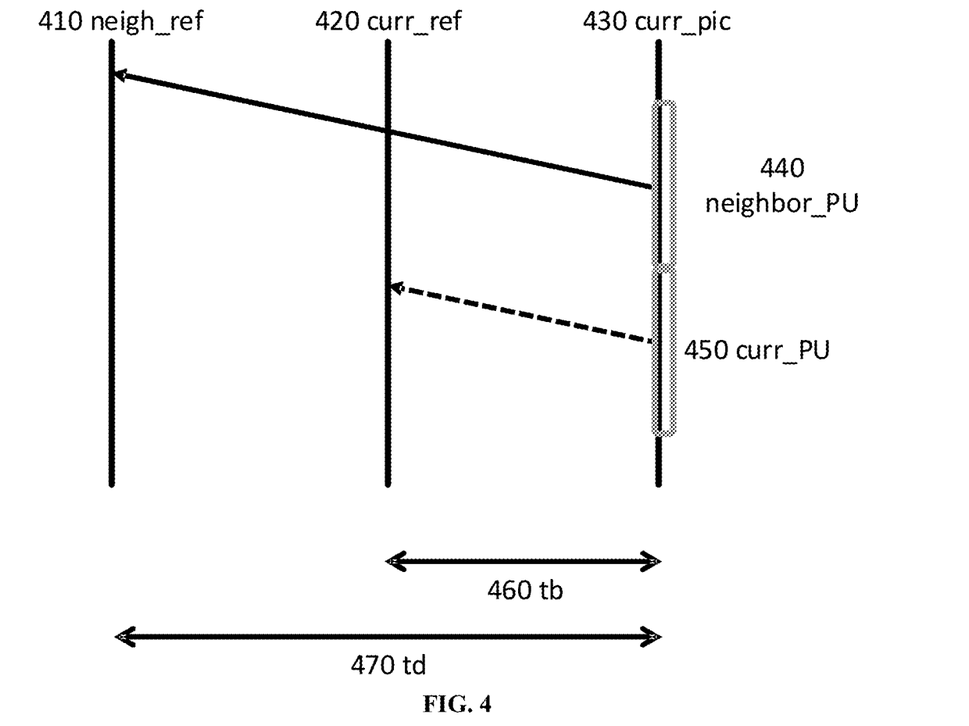
FIG. 4 is a diagram illustrating motion vector scaling for spatial motion vector candidates, according to an example of the present disclosure.

In a spatial MV scaling process, the motion vector of the neighboring block is scaled in a similar manner as for temporal MV scaling, as depicted in FIG. 4 (described below).

FIG. 4 shows an illustration of motion vector scaling for spatial motion vector candidates. The illustration includes 410 neigh_ref, 420 curr_ref, 430 curr_pic, 440 neighbor_PU, 450 curr_PU, 460 *tb*, and 470 *td*. 410 neigh_ref is the neighboring reference used for motion vector scaling. 420 curr_ref is the current reference used for motion vector scaling. 430 is the current picture used for motion vector scaling. 440 neighbor_PU is the neighboring prediction unit used for motion vector scaling. 450 curr_PU is the current prediction unit used for motion vector scaling. 460 *tb* is the POC difference between the reference picture of the current picture and the current picture. 470 *td* is the POC difference between the neighboring reference picture and the current picture.

Temporal Motion Vector Predictor Candidates

In the derivation of the temporal MVP candidate, a scaled motion vector is derived from MVs of the collocated blocks in a previously coded picture in a reference picture list. The picture containing the collocated blocks for deriving temporal MVP candidate is referred to as "collocated picture" in the following description. To derive the temporal motion candidate, an explicit flag in slice header (collocated_from_l0_flag) is firstly sent to the decoder to indicate whether the collocated picture is selected from list 0 or list 1. A collocated reference index (collocated_ref_idx) is further sent to indicate which picture in that list is selected as the collocated picture for deriving the temporal motion vector predictor candidate. The L0 and L1 MVs of the temporal MVP candidate are derived independently according to a predefined order, as shown in Table 1.

In Table 1, CollocatedPictureList is a syntax signaled to indicate from which prediction list the collocated picture is located. The scaled motion vector for temporal MVP candidate is obtained, as illustrated by the dotted line in FIG. 5 (described below). It is scaled from the selected motion vector of the co-located block using the POC distances, tb and td, where tb is defined to be the POC difference between the reference picture of the current picture and the current picture and td is defined to be the POC difference between the reference picture of the co-located picture and the co-located picture. The reference picture index of the temporal merge candidate is set equal to zero. A practical realization of the scaling process is described in the HEVC specification. For a B-slice, two motion vectors, one for reference picture list 0 and the other for reference picture list 1, are obtained and combined to make the bi-predictive merge candidate.

TABLE 1

Algorithm for deriving temporal MVP candidate
from the collocated block for TMVP in HEVC When deriving the LX MV (X could be 0 or 1) of the temporal MVP candidate, the LY MV
(Y could be 0 or 1) of the collocated block is selected to derive the LX MV of the temporal
MVP candidate for the current block. The selected LY MV of the collocated block is then
scaled according to the POC distances as described in the following paragraph.
If current picture has no backward prediction (which means there are no reference pictures
having a larger POC than current picture)
    LX MV of the collocated block is first selected if available. If the LX MV is not
available, the L(1−X) MV is then selected.
Otherwise (current picture has backward prediction)
    LN MV of the collocated block is first selected if available. The N is equal to the 1−
CollocatedPictureList (0 or 1).
    If the LN MV is not available, the L(1−N) MV is then selected.

Figure 5:
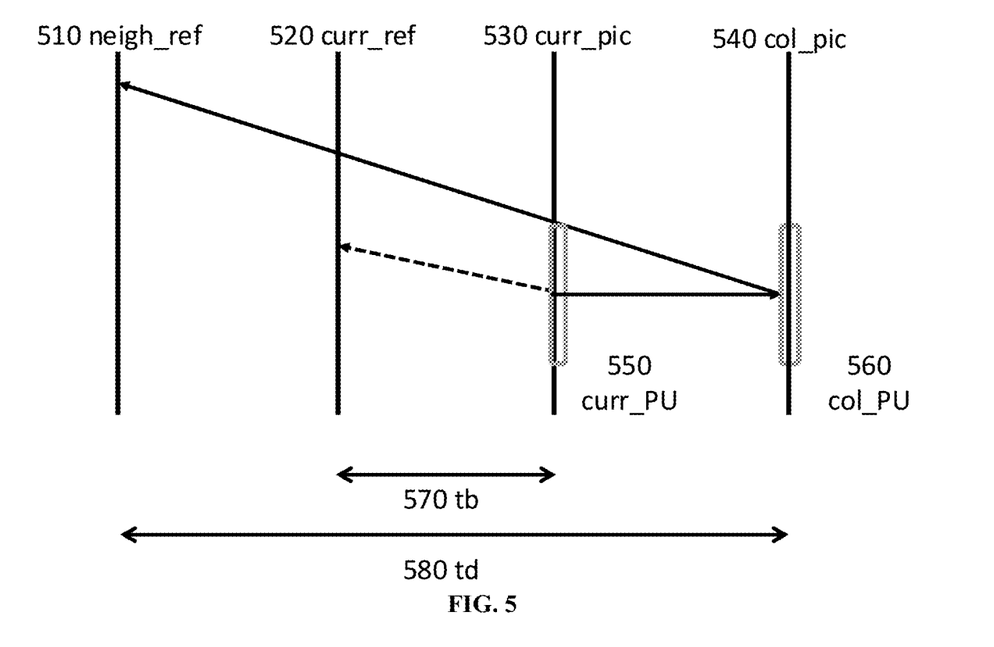
FIG. 5 is a diagram illustrating motion vector scaling for temporal merge candidates, according to an example of the present disclosure.

FIG. 5 shows an illustration of motion vector scaling for temporal merge candidate. The illustration includes 510 neigh_ref, 520 curr_ref, 530 curr_pic, 540 col_pic, 550 curr_PU, 560 col_PU, 570 tb, and 580 td. 510 neigh_ref is the neighboring reference picture used for motion vector scaling. 520 curr_ref is the current reference used for motion vector scaling. 530 curr_pic is the current picture used for motion vector scaling. 540 col_pic is the collocated picture used for motion vector scaling. 550 curr_PU is the current prediction unit used for motion vector scaling. 560 col_PU is the collocated prediction unit used for motion vector scaling. 570 tb is the POC difference between the reference picture of the current picture and the current picture. 580 td is the POC difference between the reference picture of the collocated picture and the collocated picture.

In the collocated picture, the collocated block for deriving the temporal candidate is selected between T0 and T1, as depicted in FIG. 3. If block at position T0 is not available, or is intra coded, or is outside of the current CTU, then position T1 is used. Otherwise, position T0 is used in the derivation of the temporal merge candidate.

History-Based Merge Candidates Derivation

The history-based MVPs (HMVP) are added to the merge list after the spatial MVP and TMVP. In this method, the motion information of a previously coded block stored in a table may be used as MVP for the current block. Such an MVP is called HMVP. The table containing multiple HMVP candidates is maintained during the encoding/decoding process. The table is reset (emptied) when a new CTU row is encountered. Whenever a CU is coded in a non-subblock inter-prediction mode, the associated motion information of the CU is added to the last entry of the table as a new HMVP candidate.

Spatial Motion Vector Scaling for Motion Vector Prediction

In the current design of MVP, up to one scaled spatial MV candidate may be derived. Since MV scaling process is nontrivial in terms of its complexity, a new scheme is designed to further reduce the possibility of using spatial MV scaling in deriving MVP.

Motion Vector Prediction Improvement

In this disclosure, several methods are proposed to improve the motion vector prediction in terms of complexity or coding efficiency. It is noted that the proposed methods may be applied independently or jointly.

Figure 6:
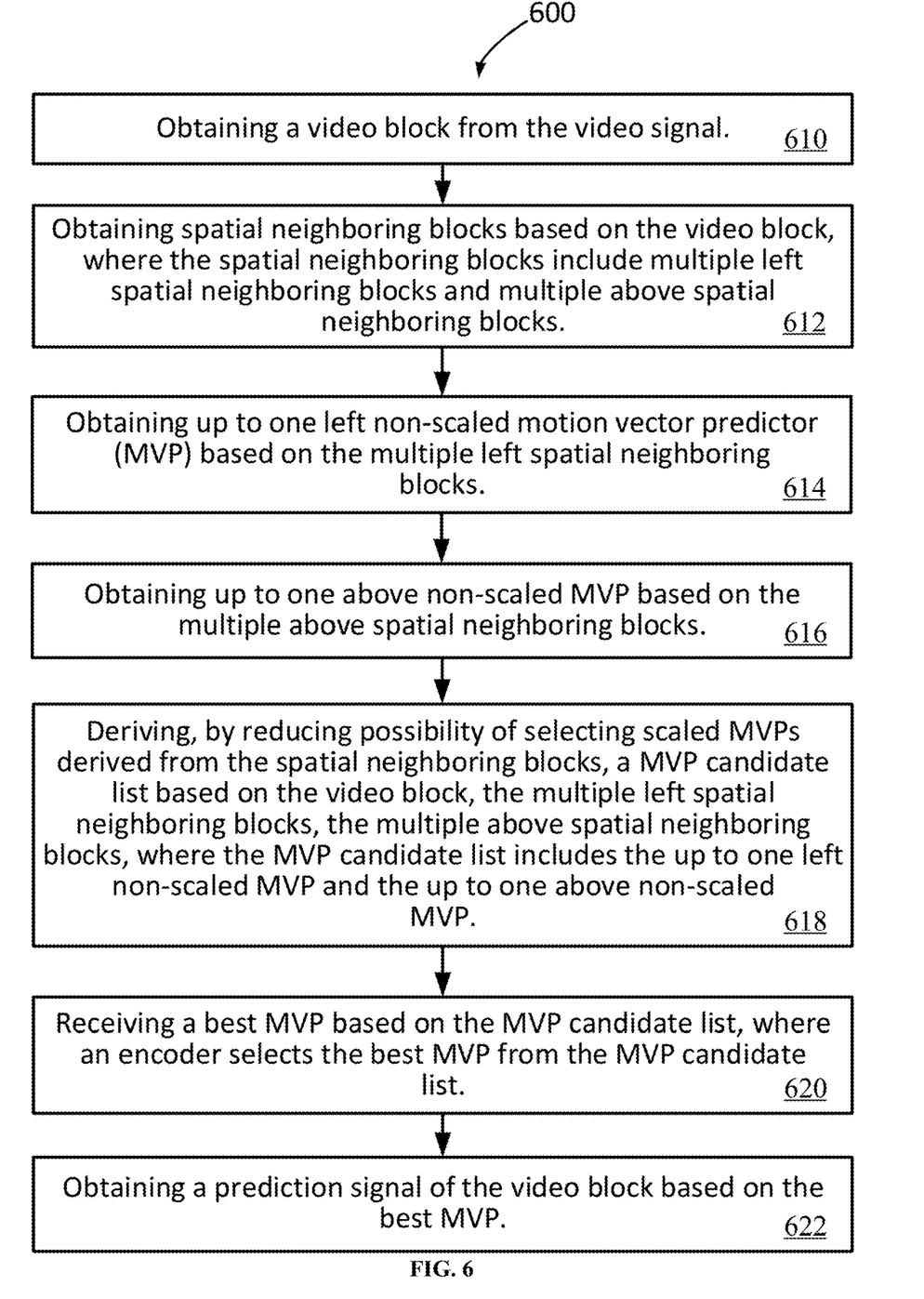
FIG. 6 is a method of decoding a video signal, according to an example of the present disclosure.

FIG. 6 shows a method of decoding a video signal in accordance with the present disclosure. The method may be, for example, applied to a decoder.

In step 610, the decoder may obtain a video block from the video signal.

In step 612, the decoder may obtain spatial neighboring blocks based on the video block. For example, the spatial neighboring blocks may include multiple left spatial neighboring blocks and multiple above spatial neighboring blocks.

In step 614, the decoder may obtain up to one left non-scaled MVP based on the multiple left spatial neighboring blocks.

In step 616, the decoder may obtain up to one above non-scaled MVP based on the multiple above spatial neighboring blocks.

In step 618, the decoder may derive, by reducing the possibility of selecting scaled MVPs derived from the spatial neighboring blocks, an MVP candidate list based on the video block, the multiple left spatial neighboring blocks, the multiple above spatial neighboring blocks. For example, the MVP candidate list may include the up to one left non-scaled MVP and the up to one above non-scaled MVP.

In step 620, the decoder may receive a best MVP based on the MVP candidate list, wherein an encoder selects the best MVP from the MVP candidate list. In one example, the best MVP may be selected by the encoder based on a cost value. For example, for some encoder designs, the encoder may use each MVP candidate to derive the MV difference between the selected MVP and the MV derived by the motion estimation. For each MVP candidate, a cost value is calculated using the bits of, for example, the MV differences and the MVP index of the selected MVP. The one with the best cost value (e.g., minimum cost) is selected as the final MVP and its MVP index is coded into the bitstream.

In step 622, the decoder may obtain a prediction signal of the video block based on the best MVP.

According to a first aspect, to reduce the possibility of selecting/deriving the scaled MVPs, it is proposed to put the scaled spatial MVP to later position when constructing the MVP candidate list. The conditions for deriving the scaled MVP from the spatial neighboring blocks may be the same or different from that in the current VVC.

In one example, the conditions for deriving the scaled MVP from the spatial neighboring blocks are kept the same as that in the current VVC. The MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to one MVP from temporal collocated blocks (T0→T1).

5) Derive up to two history-based MVPs from a FIFO table.

6) If no non-scaled MVP from left neighbor blocks is available, derive up to one scaled MVP from left spatial neighbor blocks (A0→A1).

7) If none of the neighbor blocks $A_0$ and $A_1$ are available or they are coded in intra modes, derive up to one scaled MVP from above spatial neighbor blocks (B0→B1→B2).

8) Derive up to two Zero MVs.

In another example, the conditions for deriving the scaled MVP from the spatial neighboring blocks are removed. The MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to one MVP from temporal collocated blocks (T0→T1).

5) Derive up to two history-based MVPs from a FIFO table.

6) Derive up to one scaled MVP from left spatial neighbor blocks (A0→A1).

7) Derive up to one scaled MVP from above spatial neighbor blocks (B0→B1→B2).

8) Derive up to two Zero MVs.

In a third example, the conditions for deriving the scaled MVP from the spatial neighboring blocks are modified from that in the current VVC. The MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to one MVP from temporal collocated blocks (T0→T1).

5) Derive up to two history-based MVPs from a FIFO table.

6) Derive up to one scaled MVP from left spatial neighbor blocks (A0→A1).

7) If none of the neighbor blocks $A_0$ and $A_1$ are available or they are coded in intra modes, derive up to one scaled MVP from above spatial neighbor blocks (B0→B1→B2).

8) Derive up to two Zero MVs.

In a fourth example, the conditions for deriving the scaled MVP from the spatial neighboring blocks are modified from that in the current VVC. The MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to one MVP from temporal collocated blocks (T0→T1).

5) Derive up to two history-based MVPs from a FIFO table.

6) Derive up to one scaled MVP from left spatial neighbor block A0.

7) Derive up to one scaled MVP from left spatial neighbor block A1.

8) Derive up to one scaled MVP from above spatial neighbor block B0.

9) Derive up to one scaled MVP from above spatial neighbor block B1.

10) Derive up to one scaled MVP from above spatial neighbor block B2.

11) Derive up to two Zero MVs.

According to a second aspect, to reduce the possibility of selecting/deriving the scaled MVPs, it is proposed to put both the temporal MVP and the scaled spatial MVPs to later position when constructing the MVP candidate list. The conditions for deriving the scaled MVP from the spatial neighboring blocks may be the same or different from that in the current VVC.

In one example, the conditions for deriving the scaled MVP from the spatial neighboring blocks are kept the same as in the current VVC. The MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to two history-based MVPs from a FIFO table.

5) Derive up to one MVP from temporal collocated blocks (T0→T1).

6) If no non-scaled MVP from left neighbor blocks is available, derive up to one scaled MVP from left spatial neighbor blocks (A0→A1).

7) If none of the neighbor blocks $A_0$ and $A_1$ are available or they are coded in intra modes, derive up to one scaled MVP from above spatial neighbor blocks (B0→B1→B2).

8) Derive up to two Zero MVs.

In another example, the conditions for deriving the scaled MVP from the spatial neighboring blocks are removed. The MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to two history-based MVPs from a FIFO table.

5) Derive up to one MVP from temporal collocated blocks (T0→T1).

6) Derive up to one scaled MVP from left spatial neighbor blocks (A0→A1).

7) Derive up to one scaled MVP from above spatial neighbor blocks (B0→B1→B2).

8) Derive up to two Zero MVs.

In a third example, the conditions for deriving the scaled MVP from the spatial neighboring blocks are modified from that in the current VVC. The MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to two history-based MVPs from a FIFO table.

5) Derive up to one MVP from temporal collocated blocks (T0→T1).

6) Derive up to one scaled MVP from left spatial neighbor blocks (A0→A1).

7) If none of the neighbor blocks $A_0$ and $A_1$ are available or they are coded in intra modes, derive up to one scaled MVP from above spatial neighbor blocks (B0→B1→B2).

8) Derive up to two Zero MVs.

In a fourth example, the conditions for deriving the scaled MVP from the spatial neighboring blocks are modified from that in the current VVC. The MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to two history-based MVPs from a FIFO table.

5) Derive up to one MVP from temporal collocated blocks (T0→T1).

6) Derive up to one scaled MVP from left spatial neighbor block A0.

7) Derive up to one scaled MVP from left spatial neighbor block A1.

8) Derive up to one scaled MVP from above spatial neighbor block B0.

9) Derive up to one scaled MVP from above spatial neighbor block B1.

10) Derive up to one scaled MVP from above spatial neighbor block B2.

11) Derive up to two Zero MVs.

According to a third aspect, to reduce the possibility of selecting/deriving the scaled MVPs, it is proposed to exclude the scaled spatial MVP candidates from the MVP candidate list.

Figure 7:
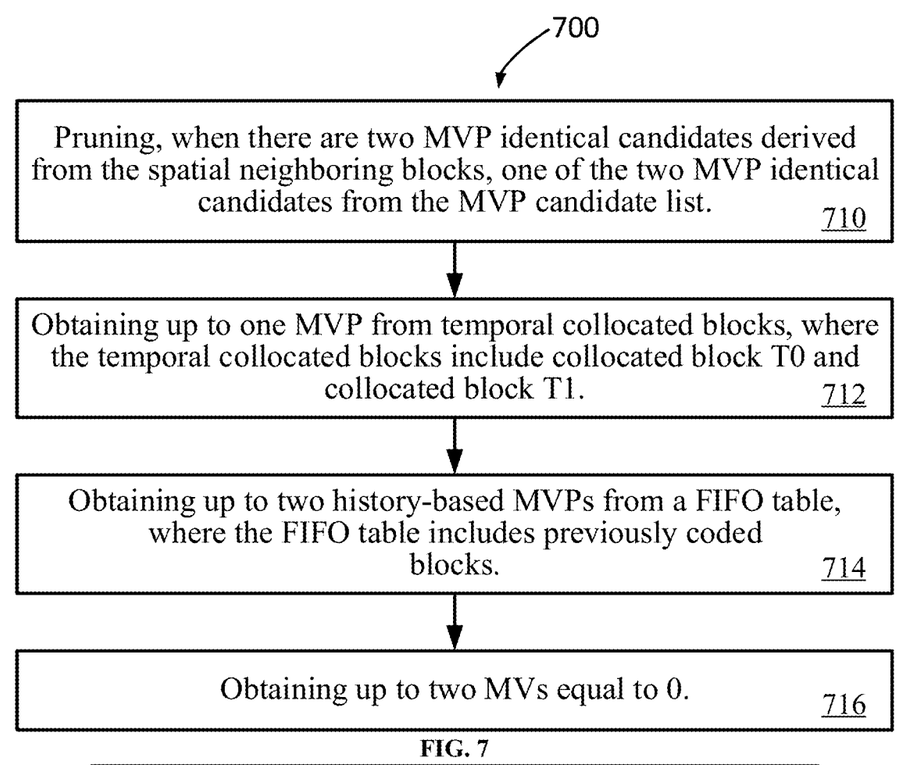
FIG. 7 is a method of deriving an MVP candidate list, according to an example of the present disclosure.

FIG. 7 shows a method of deriving an MVP candidate list in accordance with the present disclosure. The method may be, for example, applied to a decoder.

In step 710, the decoder may prune, when there are two MVP identical candidates derived from the spatial neighboring blocks, one of the two MVP identical candidates from the MVP candidate list.

In step 712, the decoder may obtain up to one MVP from temporal collocated blocks. The temporal collocated blocks include collocated block T0 and collocated block T1.

In step 714, the decoder may obtain up to two history-based MVPs from a FIFO table. The FIFO table includes previously coded blocks.

In step 716, the decoder may obtain up to two MVs equal to 0.

In one example, the MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to one MVP from temporal collocated blocks (T0→T1).

5) Derive up to two history-based MVPs from a FIFO table.

6) Derive up to two Zero MVs.

In another example, the MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to two history-based MVPs from a FIFO table.

5) Derive up to one MVP from temporal collocated blocks (T0→T1).

6) Derive up to two Zero MVs.

According to a fourth aspect, to reduce the possibility of selecting/deriving the scaled MVPs, it is proposed to exclude both the scaled spatial MVP candidates and TMVP from the MVP candidate list.

In one example, the MVP candidate list is constructed by performing the following acts using one or more processors.

1) Derive up to one non-scaled MVP from left spatial neighbor blocks (A0→A1).

2) Derive up to one non-scaled MVP from above spatial neighbor blocks (B0→B1→B2).

3) Conditional Pruning.

4) Derive up to two history-based MVPs from a FIFO table.

5) Derive up to two Zero MVs.

It is worth noting that in all those aspects and/or examples illustrated above, the derivation process stops when the MVP candidate list is full.

Figure 8:
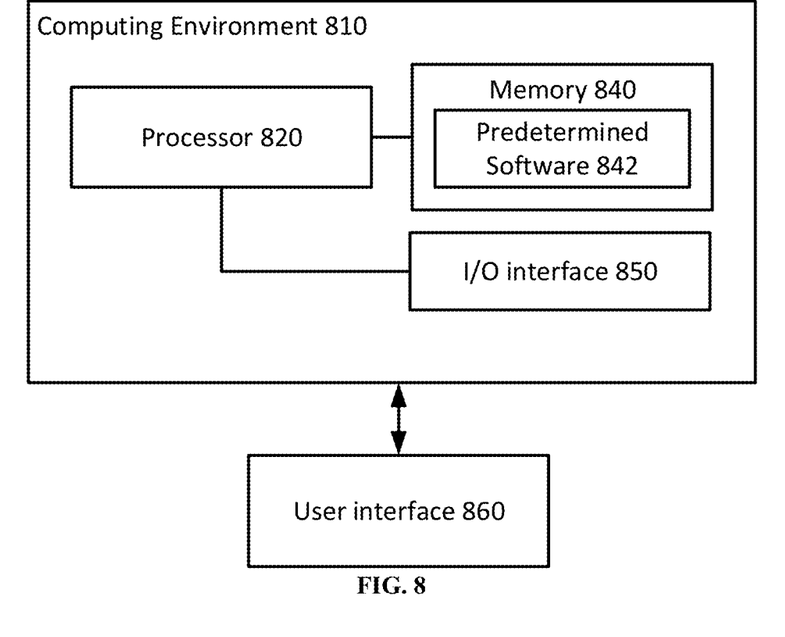
FIG. 8 is a diagram illustrating a computing environment coupled with a user interface, according to an example of the present disclosure.

FIG. 8 shows a computing environment 810 coupled with a user interface 860. The computing environment 810 can be part of a data processing server. The computing environment 810 includes processor 820, memory 840, and I/O interface 850.

The processor 820 typically controls overall operations of the computing environment 810, such as the operations associated with the display, data acquisition, data communications, and image processing. The processor 820 may include one or more processors to execute instructions to perform all or some of the steps in the above-described methods. Moreover, the processor 820 may include one or more modules that facilitate the interaction between the processor 820 and other components. The processor may be a Central Processing Unit (CPU), a microprocessor, a single chip machine, a GPU, or the like.

The memory 840 is configured to store various types of data to support the operation of the computing environment 810. Memory 840 may include predetermine software 842. Examples of such data comprise instructions for any applications or methods operated on the computing environment 810, video datasets, image data, etc. The memory 840 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 850 provides an interface between the processor 820 and peripheral interface modules, such as a keyboard, a click wheel, buttons, and the like. The buttons may include but are not limited to, a home button, a start scan button, and a stop scan button. The I/O interface 850 can be coupled with an encoder and decoder.

In some embodiments, there is also provided a non-transitory computer-readable storage medium comprising a plurality of programs, such as comprised in the memory 840, executable by the processor 820 in the computing environment 810, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 810 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

The invention claimed is:

1. A method of video coding, comprising:
obtaining a coding block from a video signal;
obtaining a plurality of spatial neighboring blocks based on the coding block, wherein the plurality of spatial neighboring blocks comprise multiple left spatial neighboring blocks and multiple above spatial neighboring blocks;
obtaining up to one left non-scaled motion vector predictor (MVP) based on the multiple left spatial neighboring blocks;
obtaining up to one above non-scaled MVP based on the multiple above spatial neighboring blocks;
deriving an MVP candidate list based on the coding block, the multiple left spatial neighboring blocks, and the multiple above spatial neighboring blocks by excluding scaled spatial MVP candidates from the MVP candidate list, wherein the MVP candidate list comprises the up to one left non-scaled MVP and the up to one above non-scaled MVP;
receiving an index indicating an MVP in the MVP candidate list; and
obtaining a prediction signal of the coding block based on the MVP indicated by the index.

2. The method of claim 1, wherein deriving the MVP candidate list comprises:
pruning, when there are two identical MVP candidates derived from the plurality of spatial neighboring blocks, one of the two identical MVP candidates from the MVP candidate list;
obtaining up to one MVP from temporal collocated blocks, wherein the temporal collocated blocks comprise a bottom-right collocated block T0 and a central collocated block T1;
obtaining up to two history-based MVPs from a First In First Out (FIFO) table; and
obtaining up to two MVs equal to 0.

3. The method of claim 2, further comprising:
obtaining an explicit flag indicating whether a collocated picture used for temporal motion vector prediction is derived from a first reference picture list or a second reference picture list.

4. The method of claim 3, further comprising:
obtaining a collocated reference index specifying a reference index of the collocated picture used for temporal motion vector prediction.

5. The method of claim 2, wherein obtaining up to one MVP from temporal collocated blocks comprises:
performing motion vector scaling on an MVP derived from the temporal collocated blocks.

6. The method of claim 5, wherein the motion vector scaling is performed based on a picture order count (POC) difference between a reference picture of a current picture and the current picture, and a POC difference between a reference picture of a collocated picture and the collocated picture.

7. The method of claim 1, wherein the plurality of spatial neighboring blocks comprise a below left block, a left block, an above right block, an above block, and an above left block.

8. A computing device comprising:
one or more processors;
a non-transitory computer-readable storage medium storing instructions executable by the one or more processors, wherein the one or more processors are configured to:
obtain a coding block from a video signal;
obtain a plurality of spatial neighboring blocks based on the coding block, wherein the plurality of spatial neighboring blocks comprise multiple left spatial neighboring blocks and multiple above spatial neighboring blocks;
obtain up to one left non-scaled motion vector predictor (MVP) based on the multiple left spatial neighboring blocks;
obtain up to one above non-scaled MVP based on the multiple above spatial neighboring blocks;
derive an MVP candidate list based on the coding block, the multiple left spatial neighboring blocks, and the multiple above spatial neighboring blocks by excluding scaled spatial MVP candidates from the MVP candidate list, wherein the MVP candidate list comprises the up to one left non-scaled MVP and the up to one above non-scaled MVP;
receive an index indicating an MVP in the MVP candidate list; and
obtain a prediction signal of the coding block based on the MVP indicated by the index.

9. The computing device of claim 8, wherein the one or more processors are configured to derive the MVP candidate list by:
pruning, when there are two identical MVP candidates derived from the plurality of spatial neighboring blocks, one of the two identical MVP candidates from the MVP candidate list;
obtaining up to one MVP from temporal collocated blocks, wherein the temporal collocated blocks comprise a bottom-right collocated block T0 and a central collocated block T1;
obtaining up to two history-based MVPs from a First In First Out (FIFO) table; and
obtaining up to two MVs equal to 0.

10. The computing device of claim 9, wherein the one or more processors are further configured to:

obtain an explicit flag indicating whether a collocated picture used for temporal motion vector prediction is derived from a first reference picture list or a second reference picture list.

11. The computing device of claim 10, wherein the one or more processors are further configured to:

obtain a collocated reference index specifying a reference index of the collocated picture used for temporal motion vector prediction.

12. The computing device of claim 9, wherein the one or more processors are configured to obtain up to one MVP from temporal collocated blocks by:

performing motion vector scaling on an MVP derived from the temporal collocated blocks.

13. The computing device of claim 12, wherein the motion vector scaling is performed based on a picture order count (POC) difference between a reference picture of a current picture and the current picture, and a POC difference between a reference picture of a collocated picture and the collocated picture.

14. The computing device of claim 8, wherein the plurality of spatial neighboring blocks comprise a below left block, a left block, an above right block, an above block, and an above left block.

15. A non-transitory computer-readable storage medium storing a plurality of programs for execution by a computing device having one or more processors, wherein the plurality of programs, when executed by the one or more processors, cause the computing device to perform acts comprising:

obtaining a coding block from a video signal;

obtaining a plurality of spatial neighboring blocks based on the coding block, wherein the plurality of spatial neighboring blocks comprise multiple left spatial neighboring blocks and multiple above spatial neighboring blocks;

obtaining up to one left non-scaled motion vector predictor (MVP) based on the multiple left spatial neighboring blocks;

obtaining up to one above non-scaled MVP based on the multiple above spatial neighboring blocks;

deriving an MVP candidate list based on the coding block, the multiple left spatial neighboring blocks, and the multiple above spatial neighboring blocks by excluding scaled spatial MVP candidates from the MVP candidate list, wherein the MVP candidate list comprises the up to one left non-scaled MVP and the up to one above non-scaled MVP;

receiving an index indicating an MVP in the MVP candidate list; and obtaining a prediction signal of the coding block based on the MVP indicated by the index.

16. The non-transitory computer-readable storage medium of claim 15, wherein the plurality of programs further cause the computing device to perform acts comprising:

pruning, when there are two identical MVP candidates derived from the plurality of spatial neighboring blocks, one of the two identical MVP candidates from the MVP candidate list;

obtaining up to one MVP from temporal collocated blocks, wherein the temporal collocated blocks comprise a bottom-right collocated block T0 and a central collocated block T1;

obtaining up to two history-based MVPs from a First In First Out (FIFO) table; and obtaining up to two MVs equal to 0.

17. The non-transitory computer-readable storage medium of claim 16, wherein the acts further comprise:

obtaining an explicit flag indicating whether a collocated picture used for temporal motion vector prediction is derived from a first reference picture list or a second reference picture list.

18. The non-transitory computer-readable storage medium of claim 17, wherein the acts further comprise:

obtaining a collocated reference index specifying a reference index of the collocated picture used for temporal motion vector prediction.

19. The non-transitory computer-readable storage medium of claim 16, wherein obtaining up to one MVP from temporal collocated blocks comprises:

performing motion vector scaling on an MVP derived from the temporal collocated blocks.

20. The non-transitory computer-readable storage medium of claim 15, wherein the plurality of spatial neighboring blocks comprise a below left block, a left block, an above right block, an above block, and an above left block.

* * * * *